(12) United States Patent
Yau et al.

(10) Patent No.: US 9,258,202 B2
(45) Date of Patent: Feb. 9, 2016

(54) CORRELATION OF PERFORMANCE MONITORING RECORDS FOR LOGICAL END POINTS WITHIN A PROTECTED GROUP

(71) Applicant: Ciena Corporation, Hanover, MD (US)

(72) Inventors: Simmon Yau, Lawrenceville, GA (US); Satish M. Gopalakrishna, Alpharetta, GA (US); Yossi Joseph Khalon, Alpharetta, GA (US); Matthew W. Connolly, Canton, GA (US)

(73) Assignee: Ciena Corporation, Hanover, MD (US)

( * ) Notice: Subject to any disclaimer, the term of this patent is extended or adjusted under 35 U.S.C. 154(b) by 274 days.

(21) Appl. No.: 13/966,092

(22) Filed: Aug. 13, 2013

(65) Prior Publication Data

US 2015/0052399 A1    Feb. 19, 2015

(51) Int. Cl.
| | |
|---|---|
| *G06F 11/07* | (2006.01) |
| *H04L 12/26* | (2006.01) |
| *H04L 12/24* | (2006.01) |
| *H04L 1/00* | (2006.01) |

(52) U.S. Cl.
CPC .............. *H04L 43/0847* (2013.01); *H04L 1/00* (2013.01); *H04L 41/065* (2013.01); *H04L 41/0663* (2013.01); *G06F 11/0709* (2013.01); *H04L 41/0613* (2013.01)

(58) Field of Classification Search
CPC .............. H04J 2203/006; H04L 65/80; H04L 41/0613; H04L 41/065; G06F 11/0709
See application file for complete search history.

(56) References Cited

U.S. PATENT DOCUMENTS

| | | | | |
|---|---|---|---|---|
| 7,263,597 | B2 * | 8/2007 | Everdell ................ | H04L 47/125 709/201 |
| 7,281,161 | B2 * | 10/2007 | Titmuss ................ | H04L 41/065 714/26 |
| 7,315,181 | B1 * | 1/2008 | Eslambolchi et al. .......... | 702/58 |
| 7,802,287 | B2 * | 9/2010 | Bialk ..................... | H04L 41/065 725/107 |
| 2004/0001501 | A1 * | 1/2004 | Delveaux ............ | H04L 12/4625 370/442 |
| 2006/0161816 | A1 * | 7/2006 | Gula ..................... | H04L 41/065 714/39 |
| 2012/0176172 | A1 * | 7/2012 | Webb et al. .................... | 327/164 |

* cited by examiner

*Primary Examiner* — Joseph Schell
(74) *Attorney, Agent, or Firm* — Clements Bernard PLLC; Christopher L. Bernard; Lawrence A. Baratta, Jr.

(57) ABSTRACT

A network system comprising logical work and protect Connection Termination Points. Performance Monitoring (PM) records are provided by generating for each work Connection Termination Point (CTP) a work bit vector and a protect bit vector. The work bit vector keeps track of severely errored seconds (SES) occurrences at the work CTP only when the work CTP is selected. The protect bit vector keeps track of severely errored seconds (SES) occurrences at the protect CTP only when the protect CTP is selected. Processing the work bit vector and the protect bit vector provides accurate PM records.

15 Claims, 3 Drawing Sheets

CORRELATION OF PERFORMANCE MONITORING RECORDS FOR LOGICAL END POINTS WITHIN A PROTECTED GROUP

FIELD OF DISCLOSURE

Embodiments pertain to communication networks, and more particularly, to performance monitoring records of logical end points in a communication network.

BACKGROUND

In a communication network, a Connection Termination Point (CTP) refers to a logical end point of a sub-network connection or link connection. A network element, such as a switch, may provide redundancy by configuring one or more CTPs as a protect CTPs, where other CTPs may be referred to as work CTPs. For example, N work CTPs and one protect CTP may be grouped together, where if any one of the work CTPs in the group goes down, the protect CTP may be utilized in place of that work CTP until it is up again.

A Performance Monitoring (PM) record or table may be used to keep track of the performance of a work CTP. A PM record may be needed to ensure that a client is receiving the level of service contracted to the client. For example, a PM record may include such performance data as: UAS-C, unavailable seconds for the circuit (from the equipment); UAS-P, unavailable seconds for the path (from the equipment); SES, severely errored seconds (from the equipment); ES, errored seconds (from the equipment); OSS, out of service seconds, determined by the SLM (Service Layer Manager), which are those seconds where the service is not routed; SS, suspect seconds, from the equipment and the SLM, which are those seconds where the SLM was not able to collect data and/or the data is suspect; and TTS, total time in seconds the circuit was provisioned during the time interval. The above data may be recorded with a granularity of 15-minute bins or time intervals.

In a protection group, there are PM records for each CTP, where the performance counters run continuously. This allows the monitoring of each CTP individually where a work CTP will have its own PM record and a protect CTP will have its own PM record. However, from the PM records of the work and protect CTPs alone, it is difficult to measure the service disrupt time when any switching or mesh activities occur with respect to the circuit under consideration. It is expected that obtaining such data at the SLM level will lead to inaccurate performance determination.

SUMMARY

Embodiments of the invention are directed to systems and methods for generating correlated Performance Monitoring (PM) records for work CTPs within a protection group.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that specific circuits (e.g., application specific integrated circuits (ASICs)), one or more processors executing program instructions, or a combination of both, may perform the various actions described herein. Additionally, the sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
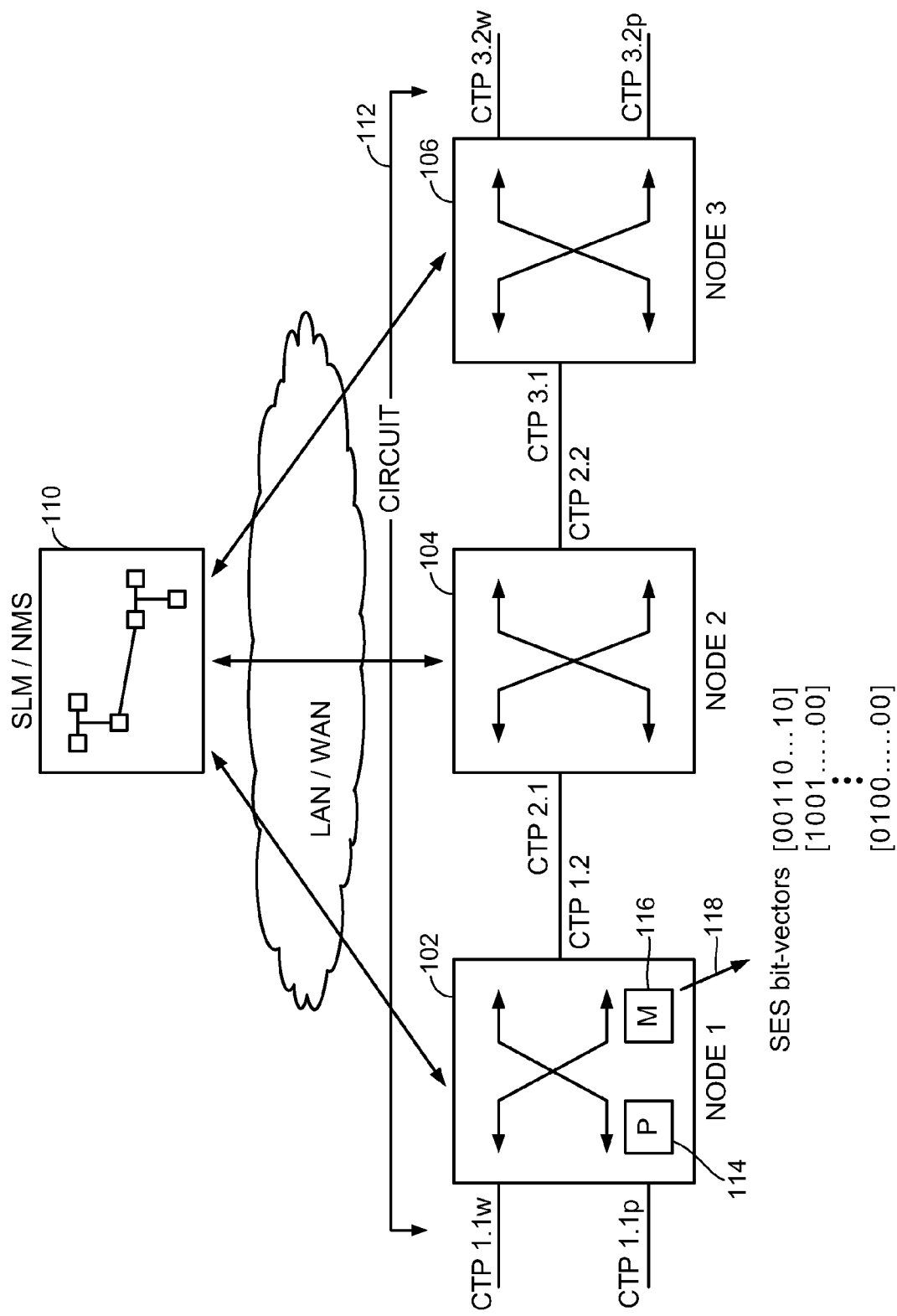
FIG. 1 illustrates a communication network in which an embodiment finds application.

Embodiments find application in communication networks, such as in network elements or nodes, with network switches and routers serving as particular examples. FIG. 1 illustrates part of a communication network, comprising three network Connection Points (CPs) or nodes labeled 102 and designated as Node 1, 104 and designated as Node 2, and 106 and designated as Node 3. Only three CPs are shown in FIG. 1 for ease of illustration, but in practice there may any number of network CPs or nodes.

A Network Management System (NMS) running Service Layer Manager (SLM) software, labeled 110, manages the CPs 102, 104, and 106. Several work CTPs are indicated and labeled in FIG. 1 as CTPn.mw, where n and m are integers with the integer n naming the node and the integer m labeling distinct CTPs associated with the node. In the particular example in FIG. 1, the line 112 denotes a circuit that has been established with CPT1.1w and CTP3.2w as terminating nodes.

The SLM/NMW 110 is shown at a location remote from the nodes, where communication is over a LAN (Local Area Network) or a WAN (Wide Area Network). However, the SLM/NMW may reside at one of the network elements (nodes).

Each network element or node comprises one or more processors and memory, where the memory may be a memory hierarchy. For simplicity of illustration, only network element 102 is shown with a processor and a memory, labeled 114 and 116, respectively. It is to be understood that the term "processor" may include more than one processor. The memory 116 stores code executable by the processor 114 to perform some or all embodiment procedures as described below.

Associated with each CTP in a protected group is an SES bit vector. The SES bit vector associated with a protected work CTP may be referred to as a work bit vector, and the SES bit vector associated with the protect CTP of the protected group may be referred to as a protect bit vector. The bit vectors associated with a network element are data structures stored in local memory. Example bit vectors are represented in FIG. 1, and are pointed to by the arrow 118.

A bit vector is first initialized to the zero bit vector when created, and has a length at least equal to the PM time period in some given time unit. For example, the length of a bit vector may be equal to the PM time period in seconds. A bit vector registers SES occurrences based on the time they occur during the PM time period. Registering an SES occurrence may comprise changing from 0 to 1 the bit value in the corresponding bit position.

As an example embodiment, suppose the PM time period is 15 minutes, where the time unit of SES measurement is a second. The bit vector length may be chosen to be 920, where the first 10 bit positions correspond to 10 seconds before the PM time period begins, the middle 900 bit positions correspond to the PM time period in seconds, and the last 10 bit positions correspond to 10 seconds after the PM time period ends. The first and last 10 bit positions, representing a total of 20 seconds, are included in this example bit vector to account for the crossing of 15-minute boundaries.

For example, if a selected work CTP experiences SES events at times 3, 13, and 871, relative to some suitably chosen zero time reference, then the corresponding work bit vector will have all 0's except that bit positions 3, 13, and 871 are changed to 1.

When a protected work CTP in a protected group is not selected, and the selector is on the protect CTP for that group, then the protect bit vector for the protect CTP registers SES occurrences in the same was as described above with respect to a work bit vector. Because the protect CTP may be selected at various times to protect various work CTPs, when a protect CTP is selected to protect a particular work CTP, the protect CTP should also record the index range for which it started and stopped protecting the particular work CTP, as well as an identifier for the particular work CTP.

During the time when the protect CTP is protecting a particular work CTP, the work bit vector for the particular work CTP does not register SES occurrences. If that particular work CTP is selected at a later time, then its work bit vector again registers SES occurrences, and the protect bit vector for the protect CTP does not register SES occurrences for that particular work CTP.

In other words, each work CTP in a protected group has an associated work bit vector and the protect CTP has an associated protect bit vector, both which are initialized to some initial vector. For a particular work CTP, its associated work bit vector registers (records) SES occurrences only when that particular work CTP is selected, and the protect bit vector for the protect CTP registers (records) SES occurrences associated with that particular work CTP only when the protect CTP is selected in place of the particular work CTP.

For a particular work CTP, the union of its work bit vector and a masked version of the protect bit vector generates what may be termed a correlated bit vector for that particular work CTP. Because the protect bit vector is used by a protect CTP for protecting all protected work CTPs in a protected group, for a particular work CTP, the protect bit vector is masked using the index range (or ranges) for that particular work CTP. The masking keeps only those bit values in bit positions associated with the index range or ranges associated with the particular work CTP.

The union may simply be the bit-wise logical OR function applied to the work bit vector and the masked protect bit vector. Once generated, the correlated bit vector may be processed to generate PM records for the work CTP. Two PM records, the SES correlated counter and the UAS correlated counter, are discussed after describing FIG. 2.

Figure 2:
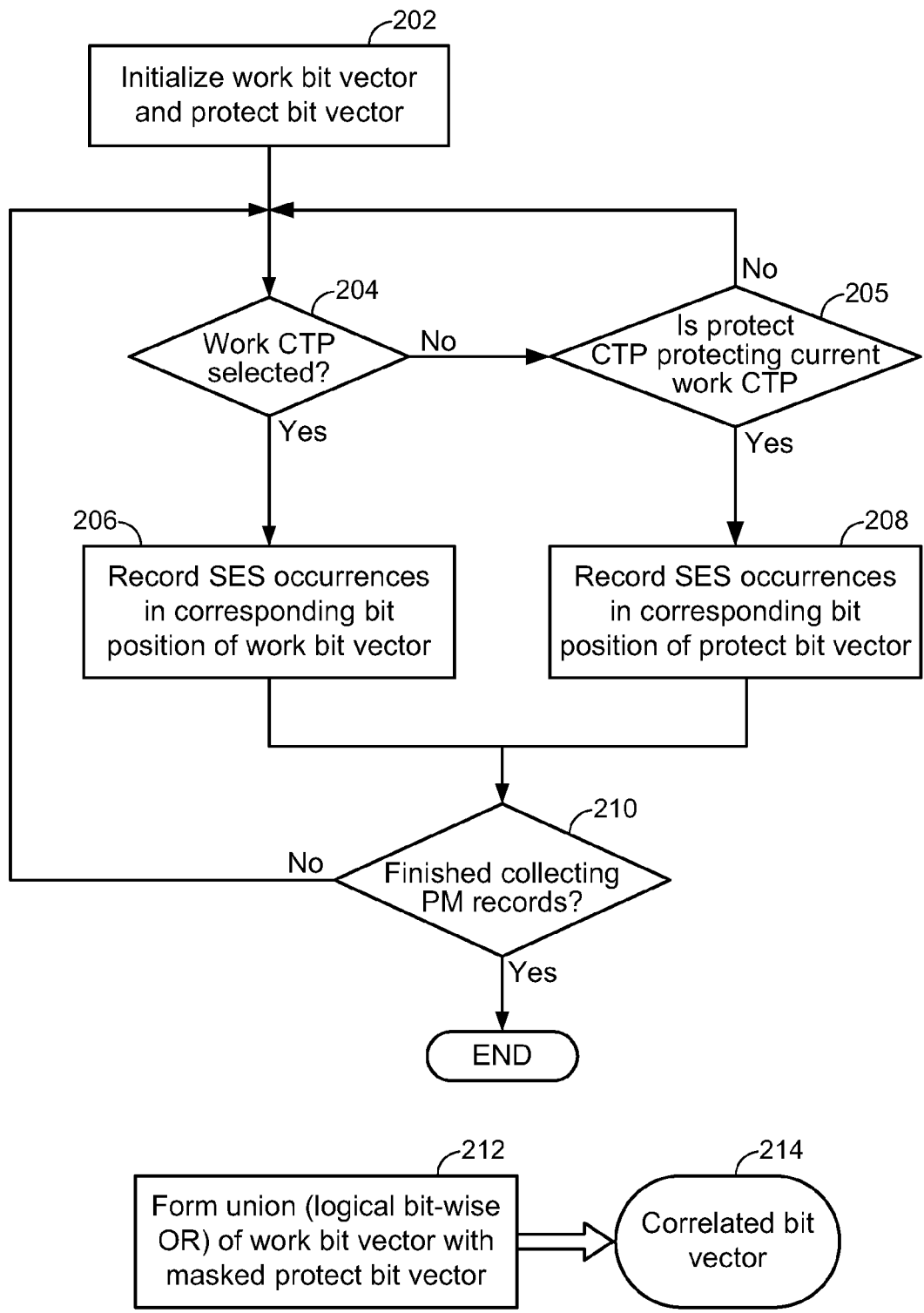
FIG. 2 illustrates a flow diagram according to an embodiment.

The flow diagram of FIG. 2 summarizes the above description. The work bit vector and protect bit vector are initialized (202). This initialization may be the all-zero bit vector, for example. When the work CTP is selected for data traffic, the work bit vector records SES occurrences by changing the bit value in the bit position corresponding to the time of the SES occurrence, as indicated in steps 204 and 206. When the work CTP is not selected for data traffic and the protect CTP for the protected group is selected, the protect bit vector records SES occurrences by changing the bit value in the bit position corresponding to the time of the SES occurrence, as indicated in steps 204, 205, and 208. The process continues until generating PM records ends, as indicated by the step 210.

Taking the union, or the bit-wise logical OR of the work bit vector and the masked protect bit vector generates a correlated bit vector, as indicated in steps 212 and 214. The separation of steps 212 and 24 from the rest of the steps in FIG. 2 is meant to imply that the steps 212 and 214 may be performed after the work bit vector and the protect bit vector have been updated, or performed at various times while the work bit vector and the protect bit vector are in the process of being updated.

For ease of discussion, it is to be understood in the description of the embodiments that in generating a correlated bit vector for a particular work CTP, the protect bit vector is masked according to that particular work CTP, that is, according to the appropriate index ranges associated with the time intervals for which the protect CTP is selected and recording SES occurrences for that particular work CTP. Accordingly, the qualifier "masked" may be left out when referring to a bit vector, it being understood that the bit vector is appropriately masked.

Figure 3:
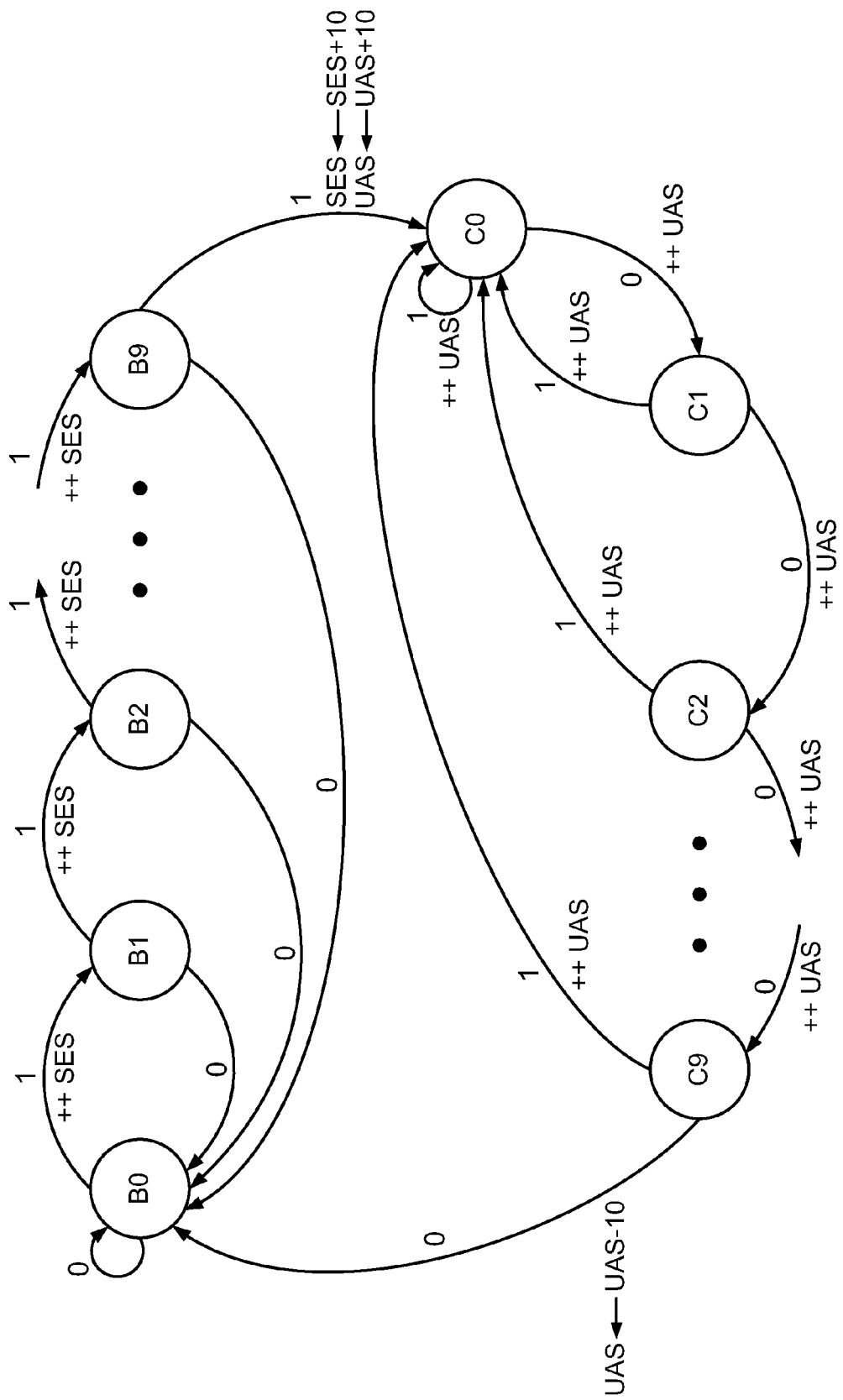
FIG. 3 illustrates a finite state machine according to an embodiment.

FIG. 3 illustrates a finite state machine (FSM) for processing the correlated bit vector to generate the SES count and the UAS count. The FSM begins at state B0. There are 10 "B" states: B0, B1, B2, ..., B9; and there are 10 "C" states: C0, C1, C2, ..., C9. A "0" on a state transition indicates no SES occurrence, which for some embodiments is represented by a "0" in the correlated bit vector. A "1" on a state transition indicates an SES occurrence, but some embodiments may use a different bit value to denote an SES occurrence.

The starting bit position in the correlated bit vector corresponds to the beginning of the time period for which PM records are desired. After each state transition, the bit value in the next bit position in the correlated bit vector is processed. The FSM of FIG. 3 stops when the bit value for the bit position corresponding to the end of the time period for gathering the PM records has been processed.

The actions taken for a state transition are indicated next to the state transition. "SES" and "UAS" indicate the SES and UAS correlated counters, respectively. The notations "++SES" and "++UAS" mean, respectively, that the SES and UAS correlated counters are incremented by one.

As seen from the FSM of FIG. 3, initially the SES correlated counter is incremented by one each time the bit value is 1. But if ten consecutive ones are encountered, which represents 10 consecutive seconds of errors for an embodiment using the second as the time unit, then the SES correlated counter is decremented by 10 and the UAS correlated counter is incremented by 10. As a result, the UAS correlated counter starts counting only when 10 consecutive SES occurrences occur. The state is now C0.

At state C0, the UAS correlated counter will increment by one for each bit position until no SES occurrences occur over 10 consecutive bit positions of the correlated bit vector. That is, for embodiments that use the second as the time unit, the UAS correlated counter will stop counting when there are no SES occurrences for a 10 second time interval. On the last bit position for which there is a string of 10 consecutive bit positions without an SES occurrence, the state will transition from C9 to B0, and the UAS correlated counter will be decremented by 10.

In the particular embodiment represented by the FSM of FIG. 3, there are 10 "B" states and 10 "C" states. The number 10 is chosen merely as an example. Other embodiments may use an integer other than 10.

The flow diagram of FIG. 2 or the FSM of FIG. 3 may be realized by a tangible, computer readable medium having stored executable instructions that can be executed by a processor to perform the process of FIG. 2 or the FSM of FIG. 3. The processor and computer readable medium may reside in the SLM/NMS 110, or one of the network elements, such as the network element 114. For example, the processor 114 may execute instructions stored in the memory 116.

Variations modifications may be made to the disclosed embodiments without necessarily departing from the scope of the claims. For example, for some embodiments, an work bit vector may be initialized to a bit vector consisting of only a 1 for each bit position, in which case a 0 is entered to indicate an SES occurrence. Clearly, this may be generalized to where a work bit vector is initialized to some initial bit vector, and a bit position is changed to some predetermined value when an SES occurrence occurs. Similar remarks apply to the protect bit vector.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for correlating Performance Monitoring (PM) records for logical end points (e.g., CTPs) within a protection group so that the PM records each appear as a single entity for its corresponding work logical end point. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method comprising:
    initializing a work bit vector associated with a work Connection Termination Point (CTP) in a group protected by a protect CTP;
    initializing a protect bit vector;
    recording occurrences of severely errored seconds (SES) in corresponding bit positions of the work bit vector only if the work CTP is selected for data traffic;
    recording SES occurrences in corresponding bit positions of the protect bit vector only if the protect CTP is selected for data traffic; and
    forming the union of the work bit vector and the protect bit vector to generate a correlated bit vector.

2. The method of claim 1, wherein initializing the work bit vector includes setting the work bit vector to an all zero bit vector, and wherein initializing the protect bit vector includes setting the protect bit vector to the all zero bit vector.

3. The method of claim 1, wherein forming the union of the work bit vector and the protect bit vector includes masking and forming a bit-wise logical OR of the work bit vector and the protect bit vector.

4. The method of claim 1, further comprising:
    initializing an SES correlated counter;
    initializing an unavailable seconds (UAS) correlated counter;
    processing bit values in the correlated bit vector according to a finite state machine (FSM), the FSM having states B(n) and C(n), wherein n is an integer index in the range 0 to N−1;
    initializing the FSM to B(0) upon initialization of the SES correlated counter and the UAS correlated counter;

transitioning to B(n+1) if a processed bit value when in B(n) indicates an SES occurrence, where n in the range 0 through N−2;

incrementing the SES correlated counter for each transition from B(n) to B(n+1) for n in the range 0 through N−2; and transitioning to B(0) if a processed bit value when in B(n) indicates no SES occurrence, where n in the range 0 through N−1.

5. The method of claim 4, wherein initializing the SES correlated counter includes setting the SES correlated counter to 0, and wherein initializing the UAS correlated counter includes setting the UAS correlated counter to 0.

6. The method of claim 4, further comprising:
transitioning to C(0) if a processed bit value when in B(N−1) indicates an SES occurrence;

decrementing the SES correlated counter by N and incrementing the UAS correlated counter by N for each transition from B(N−1) to C(0);

transitioning to C(0) if a processed bit value when in C(n) indicates an SES occurrence, where n in the range of 0 to N−1;

transitioning to C(n+1) if a processed bit value when in C(n) indicates no SES occurrence, where n in the range 0 through N−2;

incrementing the UAS correlated counter for each transition from C(m) to C(n), where m and n in the range 0 to N−1;

transitioning to B(0) if a processed bit value when in C(N−1) indicates no SES occurrence; and decrementing the UAS correlated counter by N for each transition from C(N−1) to B(0).

7. An apparatus comprising at least one processor and a memory implemented in hardware, the apparatus to provide a work Connection Termination Point (CTP) in a group protected by a protect CTP, the memory comprising instructions that when executed by the at least one processor causes the apparatus to perform a method comprising:
initializing a work bit vector associated with the work Connection Termination Point (CTP) in the group protected by the protect CTP;

initializing a protect bit vector;

recording occurrences of severely errored seconds (SES) in corresponding bit positions of the work bit vector only if the work CTP is selected for data traffic;

recording SES occurrences in corresponding bit positions of the protect bit vector only if the protect CTP is selected for data traffic; and forming the union of the work bit vector and the protect bit vector to generate a correlated bit vector.

8. The apparatus of claim 7, wherein initializing the work bit vector includes setting the work bit vector to an all zero bit vector, and wherein initializing the protect bit vector includes setting the protect bit vector to the all zero bit vector.

9. The apparatus of claim 7, wherein forming the union of the work bit vector and the protect bit vector includes masking and forming a bit-wise logical OR of the work bit vector and the protect bit vector.

10. The apparatus of claim 7, the method further comprising:
initializing an SES correlated counter;

initializing an unavailable seconds (UAS) correlated counter;

processing bit values in the correlated bit vector according to a finite state machine (FSM), the FSM having states B(n) and C(n), wherein n is an integer index in the range 0 to N−1;

initializing the FSM to B(0) upon initialization of the SES correlated counter and the UAS correlated counter;

transitioning to B(n+1) if a processed bit value when in B(n) indicates an SES occurrence, where n in the range 0 through N−2;

incrementing the SES correlated counter for each transition from B(n) to B(n+1) for n in the range 0 through N−2; and transitioning to B(0) if a processed bit value when in B(n) indicates no SES occurrence, where n in the range 0 through N−1.

11. The apparatus of claim 10, wherein initializing the SES correlated counter includes setting the SES correlated counter to 0, and wherein initializing the UAS correlated counter includes setting the UAS correlated counter to 0.

12. The apparatus of claim 10, the method further comprising:
transitioning to C(0) if a processed bit value when in B(N−1) indicates an SES occurrence;

decrementing the SES correlated counter by N and incrementing the UAS correlated counter by N for each transition from B(N−1) to C(0);

transitioning to C(0) if a processed bit value when in C(n) indicates an SES occurrence, where n in the range of 0 to N−1;

transitioning to C(n+1) if a processed bit value when in C(n) indicates no SES occurrence, where n in the range 0 through N−2;

incrementing the UAS correlated counter for each transition from C(m) to C(n), where m and n in the range 0 to N−1;

transitioning to B(0) if a processed bit value when in C(N−1) indicates no SES occurrence; and decrementing the UAS correlated counter by N for each transition from C(N−1) to B(0).

13. A non-transitory, computer readable storage medium having instructions stored thereon that when executed by at least one processor cause the at least one processor to perform a method comprising:
initializing a work bit vector associated with a work Connection Termination Point (CTP) in a group protected by a protect CTP;

initializing a protect bit vector;

recording occurrences of severely errored seconds (SES) in corresponding bit positions of the work bit vector only if the work CTP is selected for data traffic;

recording SES occurrences in corresponding bit positions of the protect bit vector only if the protect CTP is selected for data traffic; and forming the union of the work bit vector and the protect bit vector to generate a correlated bit vector.

14. The non-transitory, computer readable storage medium of claim 13, wherein initializing the work bit vector includes setting the work bit vector to an all zero bit vector, and wherein initializing the protect bit vector includes setting the protect bit vector to the all zero bit vector.

15. The non-transitory, computer readable storage medium of claim 13, wherein forming the union of the work bit vector and the protect bit vector includes masking and forming a bit-wise logical OR of the work bit vector and the protect bit vector.

* * * * *